Dec. 31, 1946. J. H. ETHRIDGE 2,413,552
FISH CAGE
Filed Jan. 29, 1945 3 Sheets-Sheet 1
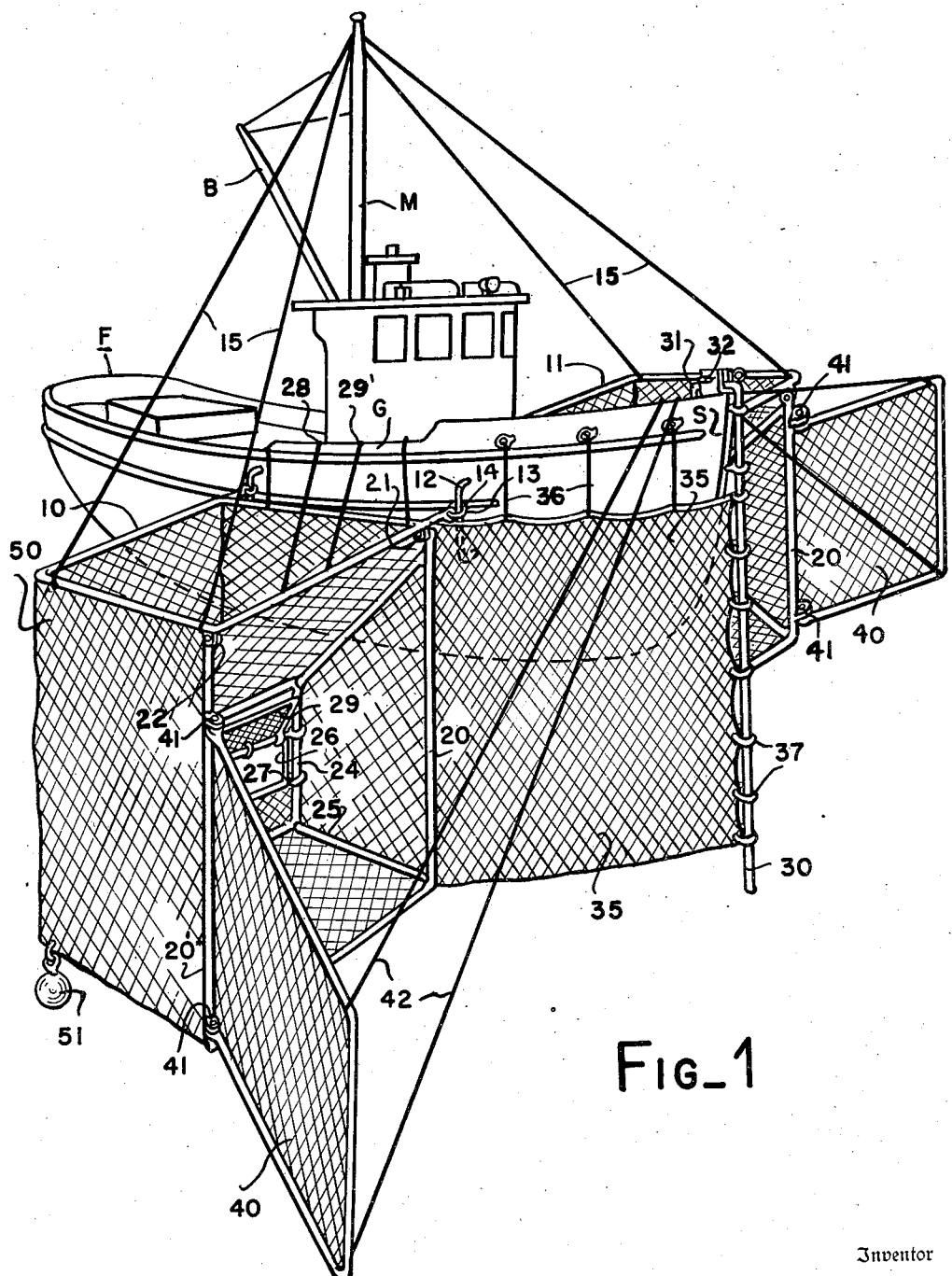
Fig_1
Inventor
JOHN H. ETHRIDGE
By
Smitt & Tuck
Attorney Dec. 31, 1946.   J. H. ETHRIDGE   2,413,552
FISH CAGE
Filed Jan. 29, 1945   3 Sheets-Sheet 2
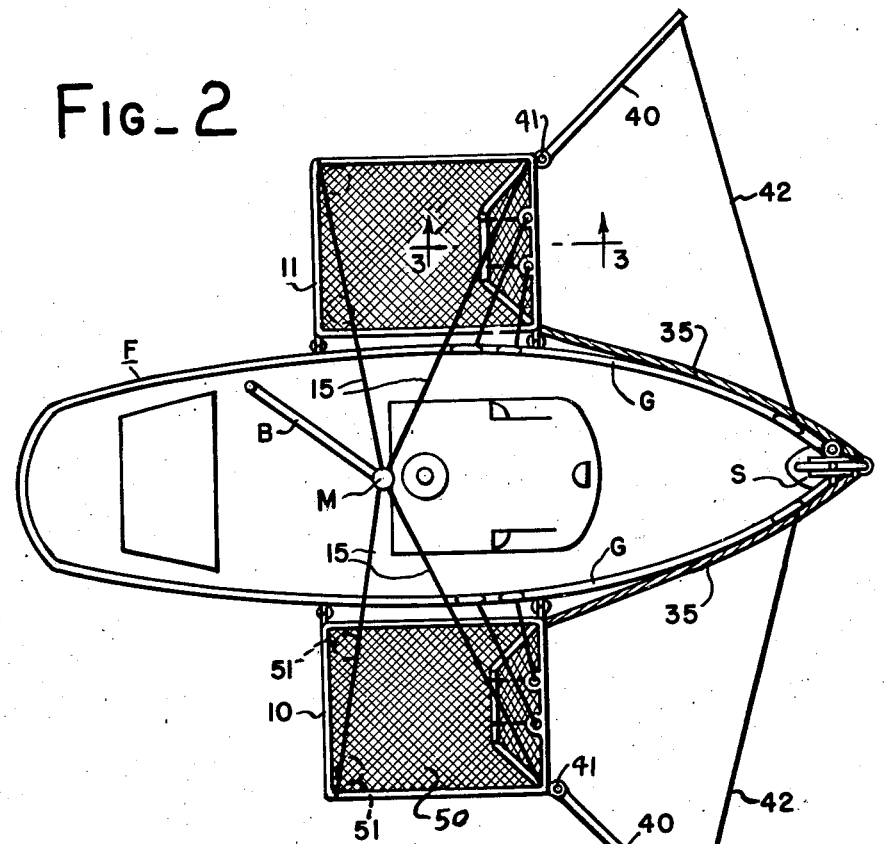
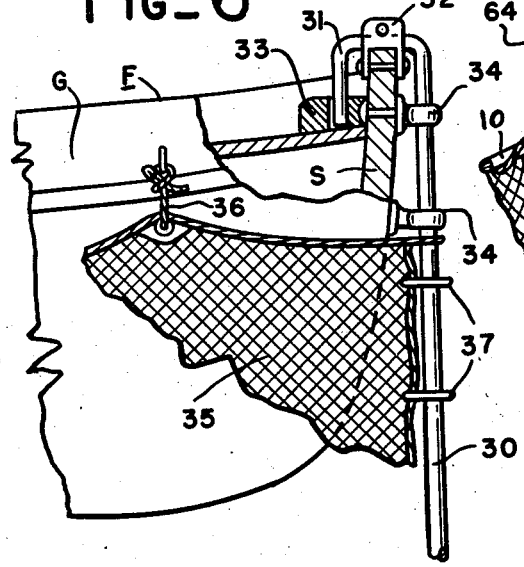
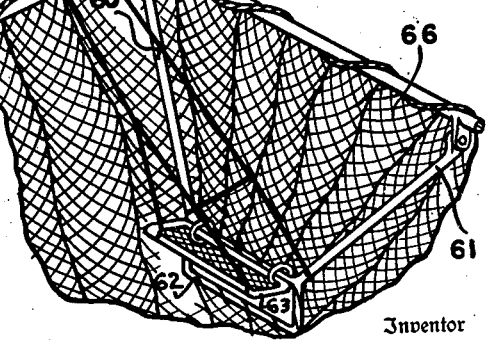
Inventor
JOHN H. ETHRIDGE
By Smith & Tuck
Attorney Dec. 31, 1946. J. H. ETHRIDGE 2,413,552
FISH CAGE
Filed Jan. 29, 1945 3 Sheets-Sheet 3
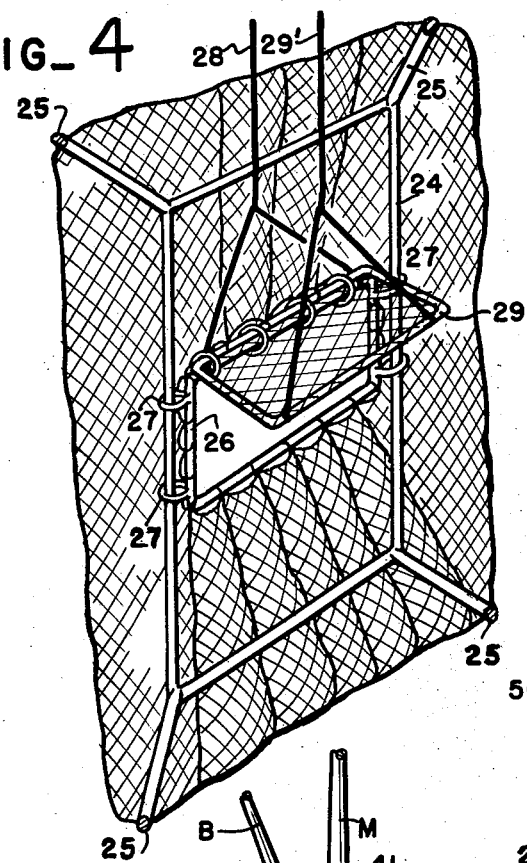
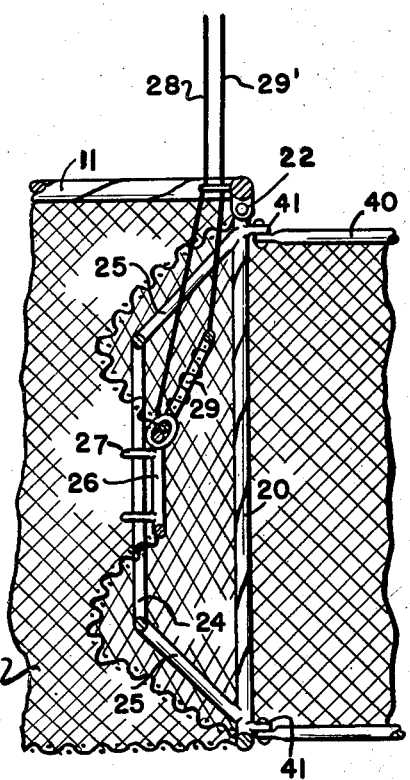
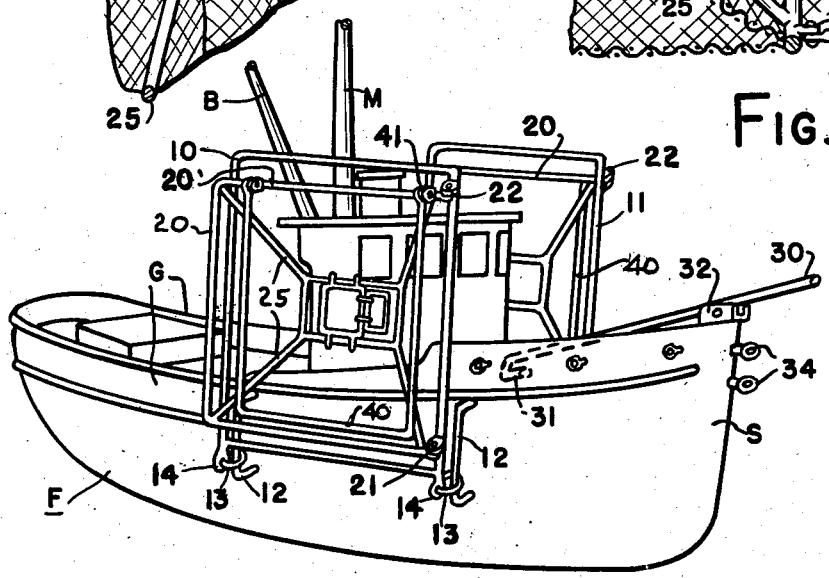
Inventor
JOHN H. ETHRIDGE
By Smith & Truck
Attorney Patented Dec. 31, 1946

2,413,552

UNITED STATES PATENT OFFICE 2,413,552

FISH CAGE

John H. Ethridge, Seattle, Wash., assignor of one-half to Val Zitz, Seattle, Wash.

Application January 29, 1945, Serial No. 575,049

7 Claims. (Cl. 43—103)

This invention relates to a fish cage and, more particularly, to a portable fish cage supported by a floating vessel and including foldable features.

In the prior art, fish traps have either taken the form of purse seines, gill nets or large stationary permanent installations along the coastline, into which fish are directed, or which devices are directed at the normal course of a school of fish for the purpose of entrapping the same. A prime criticism of stationary traps is that, unless they have been constructed at exactly the right spot, they often fail to catch and trap fish, and even then it is not uncommon for the fish to avoid the trap by establishing new courses in traveling along the coastline or to the breeding grounds. A prime criticism of the heretofore known portable traps is that they have insufficient capacity and do not direct the fish toward the trapping means in an efficient manner, since they depend largely upon being placed directly in the path of the fish as they move through the water.

Having in mind the defects of the prior art fish traps, it is an object of my invention to provide a relatively large and highly efficient cage which may not be easily avoided by the fish.

Another object of my invention is to provide, in a cage of the type described, deflector elements which will be positioned so as to direct the fish into the mouth of the cage and the pouch associated therewith.

A still further and more specific object of my invention is to provide, in a cage of the type described, foldable features which will permit the fisherman, during non-fishing periods, to compact his cage to facilitate navigation of his vessel and for other similar reasons.

The foregoing objects, and others ancillary thereto, I prefer to accomplish as follows:

According to a preferred embodiment of my invention, I support upon the sides of a vessel, a cage or pouch comprising enclosing walls, and a bottom. This pouch has a mouth in the wall normally directed forward. Adjacent this cage and its mouth are deflectors which increase the frontal area of the cage during a fishing operation in order to insure the greatest quantity of fish being directed into the mouth of the cage. Normally, a cage and associated deflector elements will be used on both sides of the vessel although it is possible under certain operations to use one-half the mechanism. The cages and deflectors extend from above the water line to a suitable distance therebelow. In the case of salmon fishing, approximately 30 to 35 ft. is a desired bottom in order that fish at all of the various normal levels can be caged. In a preferred form of my invention, the cage and the deflectors include framework members which hold the screening or netting employed in the desired shape and relationship. By being foldable the frame elements can be compacted to permit navigation of the vessel without hindrance during non-fishing periods.

The novel features that I consider characteristic of my invention are set forth with particularity in the appended claims. The invention itself, however, both as to its organization and its method of operation, together with additional objects and advantages thereof will best be understood from the following description of a specific embodiment when read in connection with the accompanying drawings, in which:

Fig. 1 is a perspective view of a fishing boat employing my fish cage and showing the general relationship of parts;

Fig. 2 is a plan view of a fishing boat with my cage elements on each side thereof;

Fig. 3 is a sectional view through the mouth of the trap taken along line 3—3 of Fig. 2;

Fig. 4 is a fragmentary enlarged perspective view of the mouth of the cage;

Fig. 5 is a fragmentary perspective view of a modified form of trap mouth;

Fig. 6 is a fragmentary elevational view of the stem of a fishing vessel disclosing details of a manner of supporting the bow deflector of my fish cage; and Fig. 7 is a perspective view illustrating the manner of folding the elements of the cage.

A fish trap, to overcome the defects hereinbefore enumerated, must have at least two totally distinct characteristics; it must be capable of full portability during a fishing operation and also during non-fishing periods; and it must also provide a wide and deep sweep during fishing and be so arranged as to properly deflect and direct all fish encountered during such a sweep into the mouth of the cage. Accordingly, a preferred embodiment of my invention, referring to Figs. 1 and 2 of the drawings, is constituted by a fishing boat along the sides and forward portion of which are mounted fish deflecting and caging elements.

Boat F is shown as having a mast M, boom B, stem S and gunwales G. Arranged on either side of the boat and loosely attached to the gunwale are cage frames 10 and 11, similar with the exception that the former is for the starboard, and the latter for the port side of the boat. As can best be seen in Fig. 1, the frame 10 is both slidably and pivotally attached to the boat by means of the traveller 12, the ring 13 is engaged in the eye 14 standing out from a corner of the frame 10. Frame 10 is supported in the desired position with respect to the boat by means of guys 15 from an upper point on the mast to the outer corners of the frame. Swingably mounted to the forward end of frame 10 is a depending frame 20 hingedly connected at 21 and 22, as can best be seen in Fig. 1. Frame 20, in the preferred form of the invention, includes the gate frame 24 supported in a concave position with respect to frame 20 by means of the corner braces 25 extending as shown throughout the drawings.

Referring now to Fig. 4, the mouth frame 26 is slidably mounted in frame 24 by means of the eyes 27 and may be raised or lowered by manipulation of the hoisting line 28. A gate 29 is attached to frame 26 across its upper portion in a pivotal manner and may be opened or closed by means of the gate hoisting line 29'.

As can best be seen in Figs. 1 and 6, an upright pole 30 having a hooked end 31 is fitted in the saddle 32 on the stem S of the vessel with its downturned hook-end seated in the socket 33, and its major portion inserted downwardly through gudgeons 34 carried on the bow of the vessel. Between pole 30 and the portion of frame 20 nearest the vessel is placed a deflector curtain 35 formed of netlike material, suspended by lines 36 from the gunwale G of the vessel and slidably attached to pole 30 by means of the hoops 37. The curtains 35 may be attached by lacing or otherwise to the frame 20. To the outboard leg 20' of the frame 20, is swingably mounted a deflector wing 40 by means of the hinged couplings 41, which deflector has netlike material stretched across the frame to form a wall to direct fish toward the mouth 26, as the fishing operation is being conducted. Guys 42 from the outboard corners of the frame 40 to the stem or forward portion of the vessel F permit adjustment in the positioning of the frame 40 for various angles of deflection relative the frame.

Suitable netting 50 is attached to the frame 10 in the form of a pouch or bag depending therefrom to serve to enclose such fish as may enter the cage through the mouth. Weights 51 facilitate keeping this pouch open and to stretch it during fishing and otherwise. The forward wall of the pouch 50 has an opening which is attached to the mouth-frame 26, and since the pouch is fairly flexible and formed of rather loosely draped netting material, the various vertical adjustments of the mouth frame are accommodated by shifting of the netting without altering the general characteristics of the cage.

Referring specifically to Fig. 5, wherein is shown an alternative form of mouth construction, the frame 10 is disclosed as having hanging on the forward portion a pair of arms 60, 61, which attach to upper corners of the mouth-frame 62 having the usual gate 63. The gate lifting line is indicated at 64 and the mouth hoisting line is indicated at 65. Connections between the frame 10, the arm 60, 61 and the mouth-frame 62 are all loose couplings. Thus when the hoisting line 65 is raised the frame 62 will also be raised to vary the vertical positioning of the opening through said frame. As before, netting 66 is secured between frame 10 and the mouth frame 62 in a fairly loose manner so that these various vertical adjustments will not disrupt the pouch unit, except slightly as to shape. A frame similar to frame 20 will be used to hold net 66 to the desired form forward of gate 63.

During a fishing operation, the cage will be set up as shown in Fig. 1 with the wings 40, 40 in position and as well the divider curtains 35, so an area several times wider than the normal beam of the vessel F will be swept to cage fish which may come against the curtains or cage walls. The fishermen operating this cage will adjust gate frame 26 or 62 in accordance with the level at which the greater majority of fish appear to be swimming in the water so as to make it most easy for the fish to enter the cage. He will adjust the wings in a manner so that such fish as come against them will be directed toward the mouth frame and of course he will have the gate in the raised or open position. Then, either by moving his boat into the oncoming stream of fish or by anchoring so that the boat is positioned in the stream of fish as they swim through the water, he will effectively direct the greater majority into the cage. The latter may be emptied in any of the conventional manners, as by bailing or otherwise.

It will be obvious that suitable braces and stiffeners are employed to distribute stress and strain and to relieve pressures that might appear to be concentrated at a single point.

At such time as the fishermen desire to move without impedance from the trap, the frame can be hoisted in the manner shown in Fig. 7, wherein frame 10 is first elevated and frame 20 is swung into a position adjacent thereto with the wing frame 40 caused to hang down exterior of the whole assembly. The netting walls of the pouch can of course be gathered and reefed in any of the well known manners to compact the same and the curtains 35 will preferably be drawn up and reefed along the gunwales of the vessel adjacent the prow or stem.

While I have shown and described particular embodiments of my invention, it will occur to those skilled in the art that various changes and modifications may be made without departing from the invention, and I, therefore, aim in the appended claims to cover all such changes and modifications as fall within the true spirit and scope of my invention.

Having thus described my invention, I claim:

1. For use with a vessel, a fish cage, comprising: forwardly flaring foraminous walls, means in the rear end of said walls forming a mouth, a cage to receive fish from through said mouth, means for varying the vertical position of said mouth relative said cage and walls, means supporting said walls, mouth and cage adjacent a vessel, and means for closing said mouth on occasion.

2. For use with a vessel, a fish cage, comprising: forwardly flaring foraminous walls, means in the rear end of said walls forming a frame having upright guide members, a mouth frame slidably mounted on said guide members and providing a mouth, a cage to receive fish from through said mouth, means for varying the vertical position of said mouth frame relative said cage and walls, means supporting said walls, mouth frame and cage adjacent a vessel, and gate means for closing said mouth on occasion.

3. For use with a vessel, a fish cage, comprising: a main frame including hinged coupling means for joining the same to a vessel, a second frame hinged to said main frame to hang therefrom lateral of such a vessel, said second frame having a mouth, netting joined to said main and second frame and mouth frame and arranged to define a cage to one side of said mouth, a curtain deflector and a wing deflector each extending from side edges of said second frame in flaring relation to each other and away from said cage, means for supporting said frames alongside a vessel, and means for closing said mouth on occasion.

4. For use with a vessel, a fish cage, comprising: a main frame including hinged coupling means for joining the same to a vessel, a second frame hinged to said main frame to hang therefrom lateral of such a vessel, said second frame having a mouth, means for vertically varying the position of said mouth frame relative said main frame, netting joined to said main and second frame and mouth frame and arranged to define a cage to one side of said mouth, a curtain deflector and a wing deflector each extending from side edges of said second frame in flaring relation to each other and away from said cage, means for supporting said frames alongside a vessel, and means for closing said mouth on occasion.

5. For use with a vessel, a fish cage, comprising: a main frame including hinged coupling means for joining the same to a vessel, a second frame hinged to said main frame to hang therefrom lateral of such a vessel, said second frame having a mouth, netting joined to said main and second frame and mouth frame and arranged to define a cage to one side of said mouth, a curtain deflector and a wing deflector each extending from side edges of said second frame in flaring relation to each other and away from said cage, means for supporting said frames alongside a vessel, and means for closing said mouth on occasion, said wing deflector comprising, a netted frame hingedly joined to a side of said second frame.

6. For use with a vessel, a fish cage, comprising: a main frame including hinged coupling means for joining the same to a vessel, a second frame hinged to said main frame to hang therefrom lateral of such a vessel, said second frame having a mouth frame, a gate frame slidably mounted to said mouth frame and forming a mouth to said cage, netting joined to said main and second frame and to said gate frame and arranged to define a cage to one side of said mouth, a curtain deflector and a wing deflector each extending from side edges of said second frame in flaring relation to each other and away from said cage, and means for supporting said frames alongside a vessel, and a gate for closing said mouth on occasion.

7. In a fish cage for use with a vessel, a main frame including hinged coupling means for joining said frame horizontally adjacent a vessel, support means to maintain said frame in such horizontal positioning, a second frame hinged to and depending from said main frame, a gate frame and means for supporting same medially of said second frame, netting carried by said main frame and joined to said gate frame and arranged to define a pouch to one side of said second frame, a netted wing frame hingedly joined to said second frame on a side edge and extending noncageward therefrom, a curtain deflector opposite said wing frame to lie alongside a vessel, a depending pole to stiffen the curtain deflector, means for supporting said wing frame and deflector curtain in flaring relation to each other, and a gate to close said gate frame on occasion.

JOHN H. ETHRIDGE.